Figure 1:
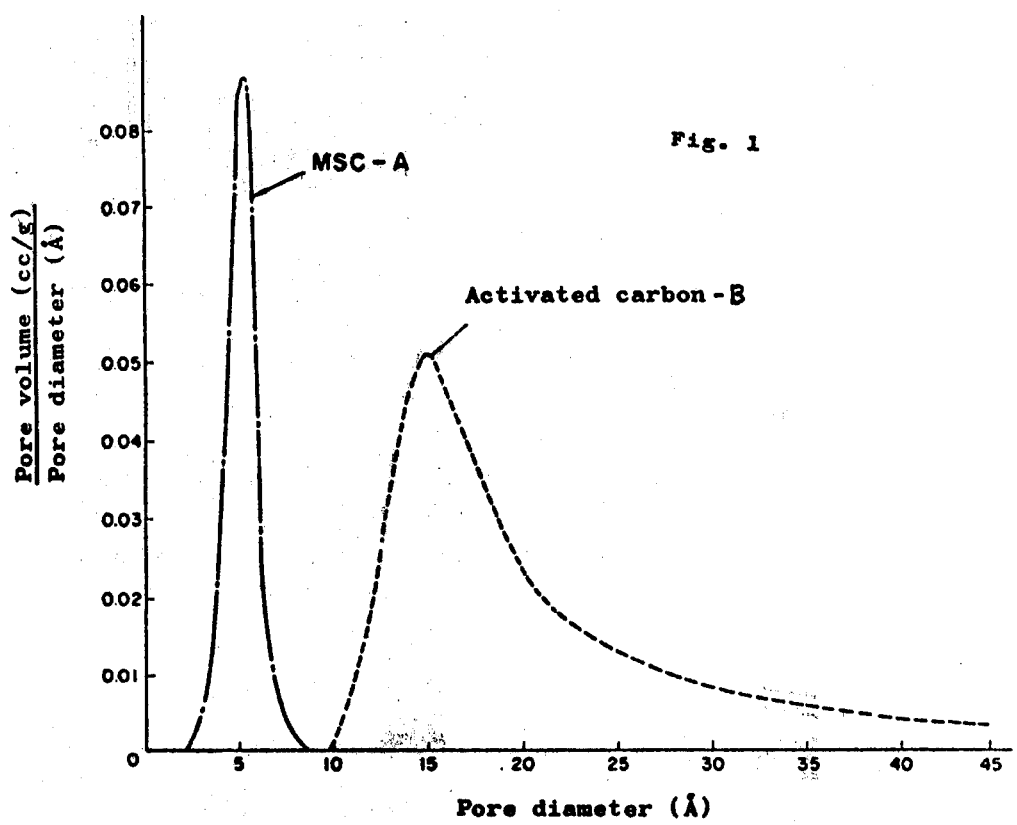

United States Patent [19]

Itoga et al.

[11] 4,261,709
[45] Apr. 14, 1981

[54] AGENT FOR THE REMOVAL OF LOW MOLECULAR WEIGHT ORGANIC GASES

[75] Inventors: Kiyoshi Itoga; Fumiichi Ogino, both of Kawanishi, Japan

[73] Assignee: Takeda Chemical Industries, Ltd., Osaka, Japan

[21] Appl. No.: 51,273

[22] Filed: Jun. 22, 1979

Related U.S. Application Data

[63] Continuation of Ser. No. 885,014, Mar. 9, 1978, abandoned.

[30] Foreign Application Priority Data

Apr. 22, 1977 [JP] Japan .................................. 52-47029

[51] Int. Cl.³ .......................................... B01D 53/04
[52] U.S. Cl. ............................................ 55/71; 55/75; 55/389; 252/441; 252/444
[58] Field of Search ...................... 55/71, 74, 75, 387, 55/389; 252/441, 444; 423/245 S

[56] References Cited

U.S. PATENT DOCUMENTS

| | | |
|---|---|---|
| 2,394,887 | 2/1946 | Berl .................................. 423/245 S |
| 3,638,399 | 2/1972 | Walker ................................. 55/74 X |
| 3,962,129 | 6/1976 | Munzner et al. ..................... 55/74 X |
| 3,996,161 | 12/1976 | Chia ................................ 252/444 X |
| 4,040,802 | 8/1977 | Deitz et al. ....................... 252/444 X |

FOREIGN PATENT DOCUMENTS

488508 12/1970 Japan ......................................... 55/71
49-37036 10/1974 Japan ..................................... 252/444

*Primary Examiner*—Robert H. Spitzer
*Attorney, Agent, or Firm*—Wenderoth, Lind & Ponack

[57] ABSTRACT

A carbonaceous molecular sieve having micropores with diameters in the range of 4 to 6 Angstrom units and bromine as adsorbed on said carbonaceous molecular sieve is able to remove selectively low molecular weight organic gases such as ethylene, acetylene, methyl sulfide, acetaldehyde etc. from air and other gases containing the same with a reduced tendency toward deactivation with time, and is useful as a removing agent of low molecular weight organic gases.

10 Claims, 2 Drawing Figures

AGENT FOR THE REMOVAL OF LOW MOLECULAR WEIGHT ORGANIC GASES

This is a continuation of application Ser. No. 885,014, filed Mar. 9, 1978, now abandoned.

This invention relates to a removing agent for removing low molecular weight organic gases which comprises a carbonaceous molecular sieve and bromine as adsorbed thereon.

It is known that low molecular weight organic gases such as ethylene as occurring in trace amounts in the air can be removed by means of activated carbon having bromine adsorbed thereon. Nonetheless, activated carbon with adsorbed bromine suffers a marked reduction in adsorptive capacity with time.

The intensive research undertaken by us to overcome the above disadvantage has led to the finding that the use of a carbonaceous adsorbent material having pores in a specified and limited range of diameters as a support for bromine successfully accomplished a selective removal of organic gases of low molecular weight and helps provide a removing agent for removing such low molecular weight organic gases, which removing agent has a reduced tendency toward deactivation with time. Thus, the principal and essential feature of this invention is to provide a removing agent for the removal of low molecular weight organic gases, which removing agent comprises a carbonaceous molecular sieve having micropores with diameters in the range of 4 to 6 Angstrom units and bromine adsorbed thereon.

The aforesaid carbonaceous molecular sieve has, in general, an elemental analysis of not less than 90% carbon, not more than 3% oxygen and not more than 1% hydrogen and a surface area of 400 to 900 m$^2$/g, and is one in which the volume of micropores having diameters in the range of 4 to 6 Angstrom units is not less than 80% of the total volume of micropores.

The above specified carbonaceous molecular sieve can be produced, for example by the method described in Japanese Published examined patent application (Tokkyo Kōhō) No. 37036/1974, which comprises adsorbing the starting materials which will produce a phenolic resin or furan resin when polymerized and/or condensed on a carbonaceous adsorbent and, after said starting materials have been polymerized and/or condensed in situ, heating the adsorbent to a temperature in the range of about 400° to 1000° C.

While the aforesaid carbonaceous adsorbent may be any carbonaceous material having a sufficient adsorptive capacity, activated carbon and materials having properties similar to those of activated carbon are normally employed with advantage. Preferred, therefore, is a tough granular carbonaceous material which has a large adsorptive and retentive capacity for said starting materials, a porosity distribution in the region of micropores, particularly a porosity predominantly made up of micropores with diameters not exceeding 20 Å, and a high degree of hardness.

The starting materials to be adsorbed on such carbonaceous adsorbent are a phenol component, e.g. phenol, cresol, xylenol or the like and an aldehyde component, e.g. formaldehyde, acetaldehyde, benzaldehyde, furfural or the like for the formation of a phenolic resin upon polymerization and/or condensation. Alternatively the starting material may be furfuryl alcohol or furfural for the formation of a furan resin or polymerization and/or condensation. These starting materials may be used alone or as a mixture. The amounts of such starting materials are desirably selected so that the amount of carbon immobilization by the resin that will be produced therefrom on the carbonaceous adsorbent will be within the range of about 0.1 to 1.0 g, preferably about 0.3 to 0.7 g per cubic centimeter of micropores with diameters not exceeding 300 Å. For this purpose, it is normally recommended to employ about 0.1 to 2.0 g, preferably 0.3 to 1.5 g of starting materials per cubic centimeter of micropores with diameters not exceeding 300 Å in the carbonaceous adsorbent matrix. These starting materials may be used after they have been admixed with suitable amounts of carbon sources, e.g. lignin, pitch, carbohydrates, etc. or carbon immobilizing agents such as aromatic nitro compounds.

In causing the aforementioned starting materials to polymerize and/or condense on the activated carbon, a catalyst is preferably employed. The catalyst may be one of the common catalysts; for example, alkali catalysts such as sodium hydroxide, potassium hydroxide, barium hydroxide, ammonia, etc. or acid catalysts such as hydrochloric acid, nitric acid, sulfuric acid, phosphoric acid, boric acid, oxalic acid, succinic acid, etc. may be mentioned for the starting materials for the formation of phenolic resins, while acids and/or acidic salts such as hydrochloric acid, nitric acid, sulfuric acid, phosphoric acid, oxalic acid, succinic acid, boric acid, zinc chloride, magnesium chloride, etc. may be employed when said starting materials are for the formation of furan resins. For phenolic resins, alkaline catalysts are preferred. The amount of the catalyst is preferably selected from the following range.

Phenolic resins:
  Alkali catalyst: 1 to 10%
  Acid catalyst: 2 to 30%
Furan resins:
  Acid catalyst: 1.0% or less The starting materials for the production of a phenolic or furan resin are diluted with a suitable solvent such as water, methanol, benzene, creosote oil or the like to prepare a solution and the carbonaceous adsorbent is sprayed with, or dipped in, the solution. Alternatively, the starting materials may be adsorbed and supported on the carbonaceous adsorbent in gaseous phase. When a catalyst is employed, the catalyst is first adsorbed and supported on the adsorbent and the starting materials are subsequently adsorbed and supported. As an alternative, the starting materials are first adsorbed and the catalyst is then adsorbed and supported. As a further alternative, both the starting materials and catalyst may be simultaneously adsorbed. Among these and other alternatives, the procedure of adsorbing the catalyst first and the starting materials next is particularly desirable. This operation may be performed in two successive steps. Thus, the starting materials and the catalyst may be adsorbed and supported in an optional combination or sequence.

The polymerization and/or condensation of the starting materials proceeds under heat of adsorption which is generated as the starting materials are adsorbed on the adsorbent. If necessary, however, the polymerization and/or condensation reactions may be accelerated by heating to a temperature beyond room temperature to 200° C. In the course of such heating, the solvent and residual unreacted components are desorbed and evaporated.

The carbonaceous adsorbent thus treated is then carbonized. The carbonization is effected by any of the procedures normally followed in the carbonization stage for the production of activated carbon. Thus, the carbonization may comprise a preliminary oxidation stage and a subsequent carbonization stage or a direct one-step carbonization process. The preliminary oxidation may be conducted at a low temperature in an atmosphere containing oxygen. In one of such carbonizing procedures, the adsorbent is heated to a temperature between 400° and 1000° C. in streams of an inert gas, e.g. $N_2$, $H_2$, He, CO, $CO_2$ or $SO_2$, or a vacuo. The presence of a minor amount of oxygen in this process is tolerated. Normally, the heating rate is desirably held at about 50° C./hr. to about 400° C./hr. so as to retard the decomposition of the resin.

The diameters of the micropores in the resultant carbonaceous molecular sieve are for the most part within the range of 4 to 6 Angstrom units and the relation of pore diameter and pore volume is as indicated by MSC-A in FIG. 1. By comparison, the ordinary activated carbon has large pore diameters in a broad distribution as, for example, indicated by Activated carbon-B in FIG. 1.

The carbonaceous molecular sieve thus specified is employed in shape and particle size classifications suited to the intended use, such as spherical or cylindrical molded pellets, irregular fragments or granules, or powders.

While the carbonaceous molecular sieve may as such be used to adsorb bromine, a small amount of phosphoric acid, boric acid or a salt thereof may be previously supported on the adsorbent and this previous adsorption of such additional component contributes further to a reduced degradation with time in the removing ability of the composition of this invention. As to the method of supporting such an additional compound, an aqueous solution containing the compound at a suitable concentration may be used to spray, and be adsorbed into, the carbonaceous molecular sieve, or the carbonaceous molecular sieve may be dipped in such an aqueous solution so as to effect the necessary supporting by a liquid-phase sorption process. The amount of such a compound to be previously supported is normally 0.02 to 2 weight percent and, preferably, 0.05 to 1 weight percent.

The amount of bromine to be adsorbed on the carbonaceous molecular sieve is 2 to 30 weight percent and, preferably, 5 to 20 weight percent.

As to the methods of adsorbing bromine on the carbonaceous molecular sieve, there may be mentioned, among others, (1) a gaseous phase adsorption process in which a carrier gas containing gaseous bromine is contacted with the carbonaceous molecular sieve, (2) a liquid-phase adsorption process which comprises immersing the carbonaceous molecular sieve in an aqueous solution of bromine and (3) an adsorption method wherein liquid bromine is directly sprayed on a carbonaceous molecular sieve. Of those alternative methods, the gaseous-phase adsorption process is the most desirable.

In the above gaseous-phase adsorption process, the carrier gas may be air, nitrogen gas, carbon dioxide gas or the like. The mixing ratio of bromine gas to carrier gas is normally such that the concentration of bromine gas will be no more than 30 volume %, preferably in the range of 0.05 to 2 volume %. The contacting temperature is not more than 150° C. and, preferably, not more than 80° C. Since a heat of adsorption is evolved in the adsorption process, the contacting procedure and the temperature of gas and of the adsorption vessel are desirably adjusted and controlled so that the contacting temperature will not rise beyond 150° C. A procedure suited for this purpose is a continuous gaseous-phase adsorption process in which a bromine-containing gas is circulated through and brought into contact with a fluidized bed, moving bed or jet bed comprised of the carbonaceous molecular sieve particles. The present removing agent thus produced by the adsorption of bromine is preferably further treated to remove the unadsorbed bromine by circulating a carrier gas over it at a temperature not exceeding 100° C.

In the liquid-phase adsorption process, the carbonaceous molecular sieve is immersed in a 2 to 3% aqueous solution of bromine at a temperature not exceeding 50° C., preferably not more than 30° C., for about one to 10 hours. The carbonaceous molecular sieve thus treated with bromine is taken out by filtration or other procedure and dried. By this process also is obtained a removing agent according to this invention.

In the method which comprises spraying the carbonaceous molecular sieve with liquid bromine, liquid bromine is directly sprayed over the carbonaceous molecular sieve under stirring and, if necessary, the molecular sieve thus treated is dried. This process also yields a removing agent according to this invention. The temperature at which liquid bromine is sprayed is desirably not higher than 50° C.

The agent thus obtained is capable of brominating and adsorbing olefines and acetylenes containing 2 to 4 carbon atoms, especially 2 to 3 carbon atoms, and of oxidizing and adsorbing aldehydes, alkyl sulfides and mercaptanes containing 1 to 4 carbon atoms, especially 1 to 3 carbon atoms. Thus, the removing agent according to this invention is able to remove olefines such as ethylene, propylene, etc.; acetylenes such as acetylene; alkyl sulfides such as methyl sulfide, ethyl sulfide, etc.; aldehydes such as acetaldehyde, formaldehyde, etc.; and mercaptanes such as methyl mercaptane, ethyl mercaptane, etc. from air and other gases.

The removing agent of the present invention can be used for adsorption of the low molecular weight organic gases, and applied to removal of a bad smell originating from sewage treatment, drainage treatment, etc. Further, the removing agent of the present invention can be used for preservation of fresh vegetables and fruits. It is known that ethylene which is generated from vegetables and fruits accelerates ripening and decay of the vegetables and fruits. By removing the ethylene with the removing agent of the present invention from the atmosphere surrounding vegetables and fruits, it is possible to keep the freshness of vegetables and fruits for a relatively long period of time. In this case the fragrance of vegetables and fruits is not removed from the atmosphere since, in general, the molecular weights of the substances which give out the fragrance are too high to be adsorbed into the present removing agents. As a matter of fact, when 10 kilograms of apples just harvested was packed in polyethylene film having 30μ thickness and sealed together with a paper bag containing 10 grams of the removing agent of the present invention, which was then kept at 1° C., the freshness and the fragrance of the apples was kept even after 4 months. Because it does not adsorb higher molecular compounds on account of its molecular sieve action, the removing agent according to this invention is less liable to suffer reductions in removing ability than the ordinary activated carbon even when the gas being treated contains high molecular compounds in addition to ethylene and other low molecular substances.

The following examples are intended to further illustrate this invention.

EXAMPLE 1

A glass column with an inside diameter of 60 mm was packed with 50 g of Granular Shirasagi MSC-5 Å (a carbonaceous molecular sieve manufactured by Takeda Chemical Industries, Ltd.; analysis: C, 95%; O, 2%; H, 0.8%, ashes, 1.5%; B.E.T. surface area: 600 m$^2$/g; the volume ratio of 4–6 Å micropores to all micropores: 93% (by Molecular Prove's Method; J. J. Kipling and B. McEnaney, Second Conference on Industrial Carbon and Graphite (1966) page 380, The Society of Chemical Industry, London)) and a closed gas circuit was set up with a pump and the column. With a dry air being circulated at the flow rate of 30 l/min., bromine gas was introduced at 1.0 g/min. and mixed with the air in this circuit to effect the adsorption of bromine under the conditions set forth in Table 2.

As a control, Granular Shirasagi Gx 4/6 (an activated carbon manufactured by Takeda Chemical Industries, Ltd.; analysis: C, 93%; O, 3%; H, 0.8%; ashes, 2%; surface area: 1150 m$^2$/g; the volume ratio of 4–6 Å micropores to all micropores: 6%) by way of a support was treated with bromine in the same manner as above. The physical parameters of the adsorbent supports are given in Table 1.

TABLE 1

| Physical parameters | Support A<br>Carbonaceous molecular sieve MSC-5 Å 4/6 | B<br>Activated carbon, Gx 4/6 |
| --- | --- | --- |
| Packing density (g/cc) | 0.585 | 0.450 |
| Average diam. of micropores (Å) | 5.0 | 18 |
| Volume of micropores (cc/g) | 0.19 | 0.45 |

TABLE 2

| Removing agent | Support | Predeposited with: % | Bromine adsorbed % | Bromine adsorption temperature (°C.) |
| --- | --- | --- | --- | --- |
| (1) | A | Phosphoric acid, 0.5 | 12.5 | 25 |
| (2) | A | Boric acid, 0.5 | 12.5 | 25 |
| (3) | A | Phosphoric acid, 0.5 | 12.3 | 25 |
| (4) | A | None | 3.0 | 25 |
| (5) | A | None | 7.5 | 25 |
| (6) | A | None | 15.5 | 25 |
| (7) | A | None | 30.1 | 25 |
| (8) | A | None | 15.2 | 150 |
| (9) | A | None | 15.8 | 200 |
| Control(R-10) | B | Phosphoric acid, 0.5 | 16.2 | 25 |
| Control(R-11) | B | None | 16.0 | 25 |
| Control(R-12) | A | None | 0 | — |

Figure 2:
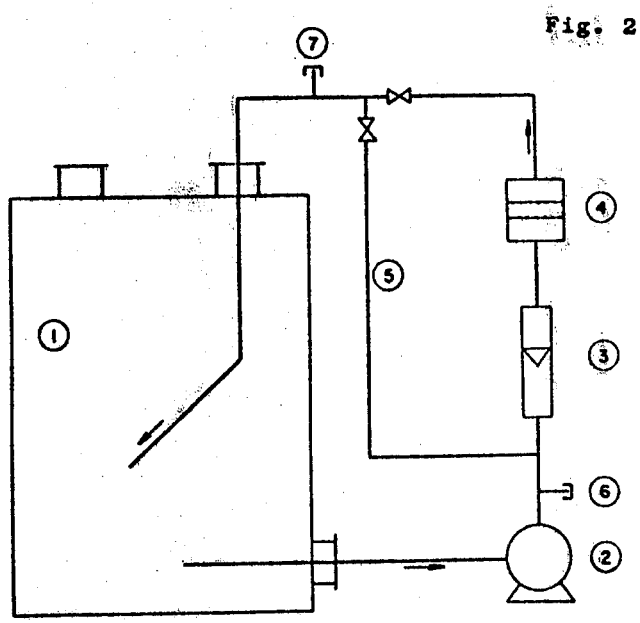

About 10 g of each removing agent was taken and, using the circulating gas adsorption setup illustrated in FIG. 2, the gaseous-phase adsorption of ethylene was carried out at 25° C. The equilibrium adsorptions at about 200 ppm. were determined. The data are given in Table 3. The equilibrium adsorption was determined by analyzing the post-adsorption gas for the concentration of ethylene by gas chromatography and calculating the difference between the amount of ethylene injected at about 200 ppm until an equilibrium was established and the residual amount of ethylene. The prepared removing agents were each kept in a sealed polyethylene bag and the change in the equilibrium adsorption of ethylene with time was investigated.

TABLE 3

| Removing agent No. | Equilibrium adsorption of ethylene (Nml/g) (25° C., 200 ppm) | | |
| --- | --- | --- | --- |
| | After 1 day | After 5 days | After 30 days |
| (1) | 7.0 | 5.8 | 5.5 |
| (2) | 6.8 | 5.7 | 5.4 |
| (3) | 6.2 | 5.1 | 4.9 |
| (4) | 5.4 | 2.5 | 2.1 |
| (5) | 6.6 | 4.3 | 4.0 |
| (6) | 7.5 | 6.0 | 5.6 |
| (7) | 8.2 | 6.3 | 5.8 |
| (8) | 6.8 | 5.7 | 5.4 |
| (9) | 6.4 | 5.3 | 4.9 |
| (R-10) | 7.3 | 5.5 | 3.5 |
| (R-11) | 7.4 | 3.2 | 2.6 |
| (R-12) | 0.01 | 0 | 0 |

Referring to FIG. 2 which shows a circulating gas adsorption apparatus, the gas in a gas holder 1 is fed by a pump 2 and through a flow meter 3 into a bed of removing agent 4, from which a portion of the gas is fed back to the gas holder 1, with the remaining portion of the gas being returned to the bed of removing agent through a bypass line 5 and the flow meter 3. Ethylene is injected from an injection port 7 to maintain the concentration of ethylene in the gas holder 1 at a constant level and after a predetermined time of circulation, a small sample of the gas is withdrawn from a gas sampling port 6 to determine the concentration of ethylene.

EXAMPLE 2

The removing agent produced in Example 1 was crushed and screened to 10–20 meshes after an elapse of 30 hours and packed into a glass column with an inside diameter of 40 mm to prepare a bed 5 cm high. Then, an air containing 10.0 ppm. of methyl sulfide and 2000 ppm of isooctane was circulated and adsorbed at a flow rate of 3 l/min. and a temperature of 25° C. The concentration of methyl sulfide in the effluent gas was measured with a gas chromatographic setup equipped with F.P.D. (flame photometric detector) and the flow time till a break-through point of 0.1 ppm. was determined. The results are set forth in Table 4.

TABLE 4

| Removing agent | Flow time, methyl sulfide 0.1 ppm. breakthrough (min.) |
| --- | --- |
| (1) | 366 |
| (6) | 371 |
| (R-11) | 65 |
| (R-12) | 13 |

What is claimed is:

1. A process for removal of a low molecular weight organic gas selected from the group consisting of olefines having 2 to 3 carbon atoms and alkyl sulfides having 2 to 3 carbon atoms from air containing said gas, which process comprises contacting the air with a carbonaceous molecular sieve in which the volume of micropores having diameters in the range of 4 to 6 Angstrom units is not less than 80% of the total volume of micropores, said carbonaceous molecular sieve having bromine supported thereon.

2. A process as claimed in claim 1, wherein the amount of bromine to be supported on the carbonaceous molecular sieve is 2 to 30 weight percent relative to the carbonaceous molecular sieve.

3. A process as claimed in claim 1, wherein the amount of bromine to be supported on the carbonaceous molecular sieve is 5 to 20 weight percent relative to the carbonaceous molecular sieve.

4. A process as claimed in claim 1, wherein the carbonaceous molecular sieve having bromine supported thereon is prepared by contacting a carrier gas containing gaseous bromine with the carbonaceous molecular sieve.

5. A process as claimed in claim 1, wherein the low molecular weight organic gas is methyl sulfide, ethylene or propylene.

6. A removing agent for the removal of a low molecular weight organic gas selected from the group consisting of olefines having 2 to 3 carbon atoms and alkyl sulfides having 2 to 3 carbon atoms, which removing agent comprises a carbonaceous molecular sieve and bromine as adsorbed on said carbonaceous molecular sieve in which the volume of micropores having diameters in the range of 4 to 6 Angstrom units is not less than 80% of the total volume of micropores.

7. A removing agent as claimed in claim 6, wherein the low molecular weight organic gas is methyl sulfide, ethylene or propylene.

8. A removing agent as claimed in claim 6, wherein the amount of bromine to be adsorbed on the carbonaceous molecular sieve is 2 to 30 weight percent relative to the carbonaceous molecular sieve.

9. A removing agent as claimed in claim 6, wherein the amount of bromine to be adsorbed on the carbonaceous molecular sieve is 5 to 20 weight percent relative to the carbonaceous molecular sieve.

10. A removing agent as claimed in claim 6, wherein the removing agent is one prepared by contacting a carrier gas containing gaseous bromine with the carbonaceous molecular sieve.

* * * * *